March 9, 1965 H. A. FULTON ETAL 3,172,129
WATER-SAVING FLUSH VALVE
Filed July 17, 1963 2 Sheets-Sheet 1

INVENTORS
Howard A. Fulton
BY Clayton Duane Albrecht
and Milo G. Sheaffer
by B D Watts
Watts & Fisher ATTORNEYS March 9, 1965 H. A. FULTON ETAL 3,172,129
WATER-SAVING FLUSH VALVE
Filed July 17, 1963 2 Sheets-Sheet 2
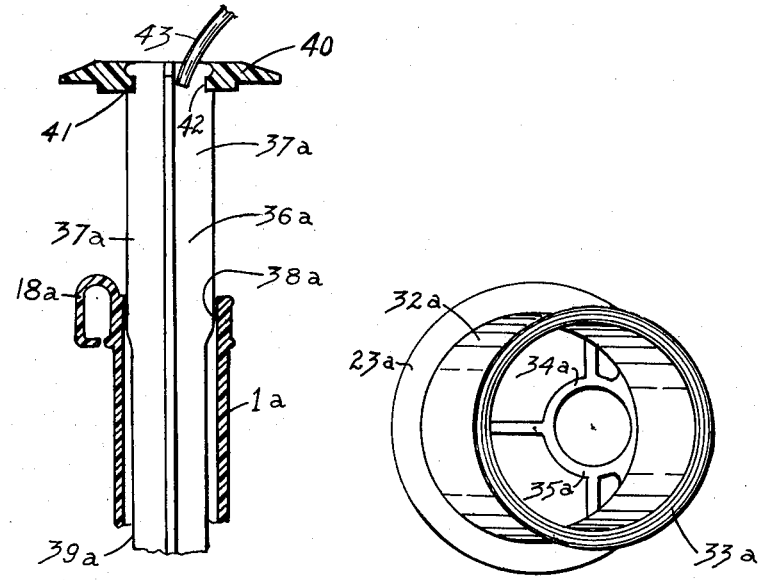
Fig. 7
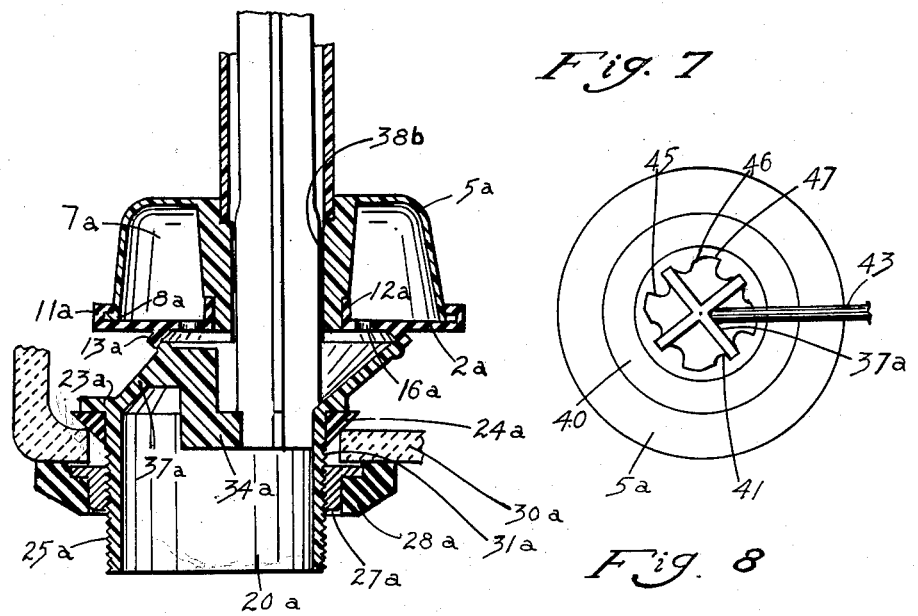
Fig. 6
Fig. 8
INVENTORS
HOWARD A. FULTON
CLAYTON DUANE OBRECHT
& MILO G. SHEAFFER
BY
B.D.Watts
WATTS & FISHER
ATTORNEYS 3,172,129
WATER-SAVING FLUSH VALVE
Howard Anthony Fulton, Perrysville, Clayton Duane Obrecht, Loudonville, and Milo George Sheaffer, Lakeville, Ohio, assignors to Mansfield Sanitary, Inc.
Filed July 17, 1963, Ser. No. 295,677
8 Claims. (Cl. 4—60)

This invention relates generally to flush valves and is particularly concerned with a new flush valve for use in the tank of a water closet.

This application is a continuation-in-part of application Serial No. 204,121, filed on or about June 21, 1962, and now abandoned.

Heretofore, many flush valves for water closet tanks have included a float ball adapted to engage a seat in the outlet pipe and seal it against egress of water and a rod attached to the float ball and passing through a guide affixed to the refill tube. A pivoted lever was loosely attached by a wire to the rod and slidable along the latter for lifting the ball off its seat and then allowing the ball to float on the water until it returned to the seat.

Such flush valves have long been unsatisfactory for several reasons. The rod attached to the float ball was often held in elevated position either by being cocked in the guide or by being held by the lifting wire with the result that water continued to flow through the inlet valve until the thus suspended float ball was released and returned to its seat. In such instances, the water which ran through the outlet pipe after the ball should have seated was wasted and an expense.

Such prior art valves could not be manually seated during the normal out flow of water from the tank. Since it is often desirable to allow only a small part of the water in the tank to flow out through the outlet pipe, this lack of manual means for shutting off the flow when desired resulted in further waste of water. Such wastes of water are becoming of primary importance due to the increase in population and the resultant lowering of the water level in the ground.

The present invention aims to avoid the several foregoing disadvantages of the prior art flush valves and to provide a flush valve which not only functions satisfactorily when acting automatically, but may also be controlled manually, if desired.

The present invention will be better understood by those skilled in the art from the following description of a preferred form of the present invention.

In the drawings accompanying and forming a part of this specification:

Figure 1:
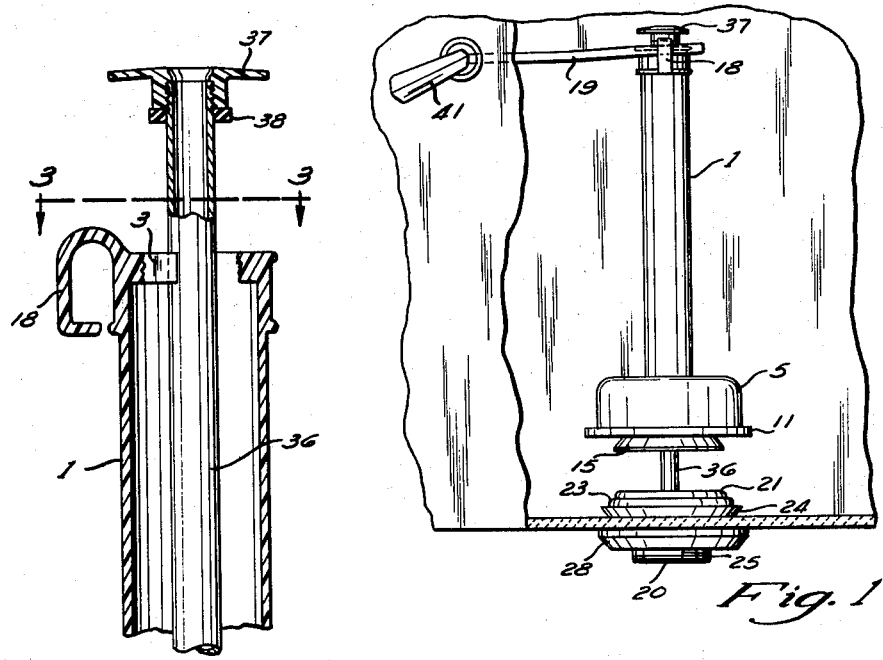
FIG. 1 is a side elevational view on a reduced scale of one embodiment of the present invention assembled with a fragmentarily illustrated water tank.
Figure 2:
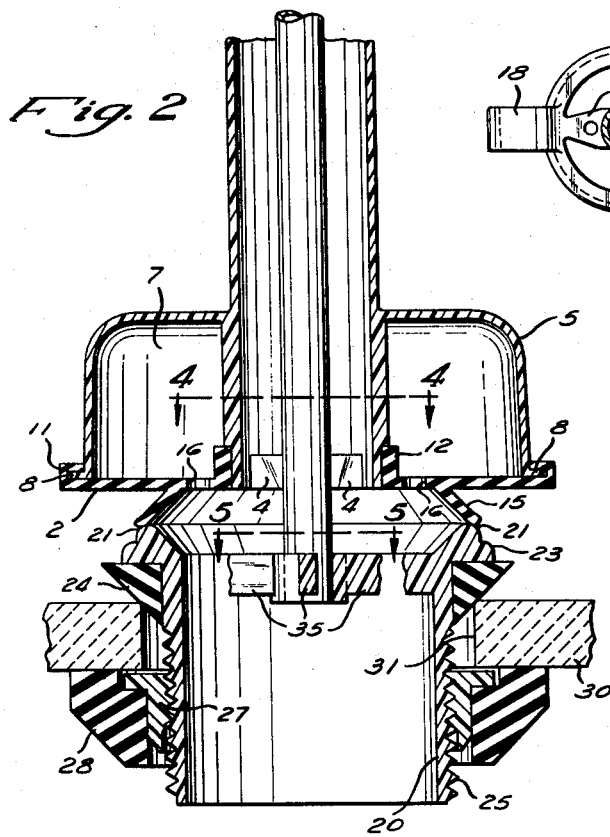
FIG. 2 is a vertical sectional view of the apparatus embodying the present invention shown in FIG. 1.
Figure 3:
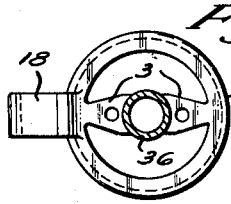
Figure 4:
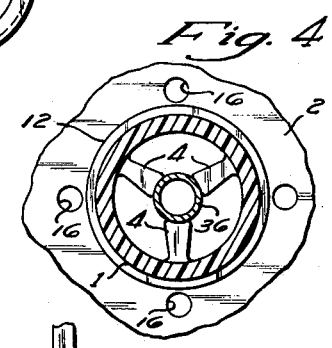
Figure 5:
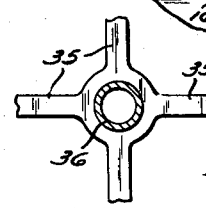

FIGS. 3, 4 and 5 are horizontal sectional views taken, respectively, on lines 3—3, 4—4 and 5—5 of FIG. 2;

FIG. 6 is a view similar to FIG. 1 but showing a modified embodiment of the invention;

FIG. 7 is a top plan view of the spud of FIG. 6; and,

FIG. 8 is a top plan view of the upper end of the device of FIG. 6.

The flush valve assembly, illustrated in FIGS. 1 and 2, may be thought of as consisting of a valve assembly and a spud assembly.

The valve assembly of FIGS. 1 and 2 comprises an elongated tube 1 and disc 2. Tube 1 has interior projections 3 and 4 near the upper and lower ends thereof to engage a guide which is attached to the spud assembly. The tube 1 is provided with a skirt 5 near its lower end which defines a large annular chamber 7 around tube 1.

The lower end of the skirt 5 is open and a flange 8 extends outwardly from the lower edge of the skirt.

A flexible disc 2 closes the open end of the skirt 5. The outer periphery 11 of this disc is provided with a groove which receives the flange 8 of the skirt and the inner periphery of the disc has a cylindrical flange 12 which closely engages the lower end of tube 1. A flexible flange 15 extends downwardly and outwardly from the lower surface of disc 2 to engage with a seat on the spud assembly. Holes 16 disposed within flange 15 extend through the disc and open into chamber 7. A loop 18 is formed integrally with the upper portion of tube 1 and is adapted to receive loosely an end of a flush lever 19.

The spud assembly comprises a pipe or spud 20 having a rounded annular upper end surface 21 to serve as a seat against which flange 15 may press to prevent egress of water from the tank into the interior of the spud. Near its upper end, spud 20 has an outwardly extending annular flange 23 and a gasket 24 surrounds spud 20 and bears against the lower surface of flange 23. The lower end of spud 20 is threaded exteriorly, as indicated at 25, and an interiorly threaded ring 27 engages with threads 25 and carries an annular gasket 28 which snugly grips the ring.

It will be understood that when ring 27 is turned on spud 20 to advance it toward flange 23, gasket 24 will be pressed against the tank bottom 30 adjacent to the hole 31 through that wall in which the spud is located. Thus, egress of water from the tank around the spud will be prevented. At the same time gasket 28 will be pressed up against the outer surface of the tank bottom and will prevent leakage of water which may have escaped past ring 24. It will be understood that the lower beveled surface of ring 28 is to bear with liquid sealing engagement on the surface of an opening into the usual bowl (not shown herein but shown in Smith Patent No. 2,721,332).

A spider 35 is formed by inwardly extending projections in spud 20. A guide 36 is anchored in this spider and extends upwardly through tube 1 and at its upper end, some distance above the top of tube 1, carries a stop 37 and a resilient bumper 38 which resiliently limits the extent of upward movement of the valve assembly. Tube 1 will serve as a refill tube when the usual refill pipe from the inlet valve leads into the upper end of tube 1.

As will be noted in FIGS. 3 and 4, projections 3 and 4 slidably engage the outer surface of the guide when tube 1 is moved vertically.

Any suitable material may be used in constructing the parts of the valve and spud assemblies. Preferably, guide 36 is a metal tube. The gaskets 24 and 28 may be made of an elastomer, such as natural or synthetic rubber. The spud 20 and stop 37 may be made of any suitable material but, preferably, are composed of the material of which the tube 1 is made. Tube 1 and its skirt 5 should be light in weight and, preferably, should not have a specific gravity of more than about one. It should be buoyant so as to float in the water in the tank and should have some flexibility. Numerous plastic materials may be used in making tube 1 and the skirt 5 including polyethylene, polypropylene, polyvinyl and, particularly, Cycolac which is a trade name for a polystyrene compound.

In a commercial size device, the inside diameter of the skirt 5 was about 3¼" with the outside diameter of the tube 1 within the skirt being about 1¼", and the vertical dimension of the chamber in the skirt being about 1¼". This tube and skirt weighed about 3¾ ounces and displaced about 185 cc. of water. It proved to be satisfactory in operation when the pressure in the street line ranged between about 125 and 175 pounds per square inch. The tube and skirt of the foregoing dimensions and characteristics and composed of Cycolac possessed a large safety factor and thus insured satisfactory operation with widely varying inlet pressures.

It will be noted that the top surface of skirt 5 and the part of the disc above flange 8 have a combined area greater than the lower surface of disc 2 outside of flange 15. As a result of these dimensions, and the fact that the flange 15 extends downwardly and outwardly, the valve assembly will be held in closed position by the water as it rises in the tank after the valve has been seated; and will float near the surface of the water after it has been lifted off the valve seat. When the valve 15 has been seated and the water rises in the tank, it exerts pressure downwardly and inwardly on the outer surface of flange 15 thereby pressing the flange 15 against the seat. As the water rises above the bottom surface of disc 2, it exerts steadily increasing pressure upwardly on the disc and also downwardly on the flange 15. However, the weight of the valve assembly is sufficient initially to overcome the lifting force of the water exerted upwardly against the bottom surface of disc 2. As the water rises above the part of the disc over flange 8, pressure is exerted downwardly thereon; and when the water rises above the top surface of skirt 5, it exerts a force downwardly on that surface. These downward forces on the skirt and flange are opposed to the upward force exerted by the water against the lower surface of disc 2. Since the sum of these downwardly exerted forces is greater than the upwardly exerted force, the valve assembly will remain in valve-closed position until manually lifted upwardly to open the outlet. When the valve assembly is lifted, the downwardly exerted force of the water exerted on the top of skirt 5 will be reduced to the extent that it is raised in the water and will be removed entirely when the top surface of skirt 5 rises above the surface of the water in the tank. At the same time, upwardly directed force of the water against the lower surface of disc 2 will be greatly reduced due to the fact that the water is flowing out of the tank below flange 15. Since the only openings through the diaphragm are small, few in number, disposed within flange 15, the entry of water into chamber 7 is substantially prevented when the valve is off its seat and yet at least partly submerged. As a result of this construction, the valve will remain seated until manually unseated and will remain unseated until seated manually or by the lowering of the water level substantially to the seat level.

The fact that the valve may be seated while there is a considerable body of water in the tank by simple manual manipulation of the handle 41 and flush lever 19 is important in actual use of the device. Raising handle 41 moves flush lever 19 downwardly to press loop 18 downward and urge flush valve 1, 2 into closed position. By such manipulation, water may be conserved since the escape of water from the tank may be halted at any desired time. Also, by such manipulation, the overflowing of a clogged bowl may be avoided with all its attendant disadvantages.

The embodiment of the present invention disclosed in FIGS. 6 to 8 is quite like that in FIGS. 1 to 5 as regards many structural features and is substantially the same as the embodiment of FIGS. 1 to 5 in operation and results.

The tube 1a is substantially free of internal projections and has a skirt 5a near its lower end which defines a large annular chamber 7a around the tube. This skirt has an open bottom and outwardly extending flange 8a at its open end.

A flexible disc 2a closes the open end of skirt 5a. This disc has an outer grooved periphery 11a which receives the flange 8a and has an inner cylindrical flange 12a which grips the lower end of tube 1a. A flexible annular flange 13a extends downwardly and outwardly from the lower surface of the disc 2a to engage with a seat on the spud assembly. Holes 16a extend through the disc 2a within the area surrounded by the flange 13a. These holes 16a open into the chamber 7a. A loop 18a is formed integrally with the upper end of tube 1a and is adapted to receive loosely the end of a flush lever such as lever 19 of FIG. 1.

The spud assembly comprises a spud 20a having an outwardly extending flange 23a to engage the upper side of annular gasket 24a; and the lower end of spud 20a is exteriorly threaded as at 25a for threaded engagement with an interiorly threaded ring 27a which carries an annular gasket 28a. When ring 27a is screwed up on spud 20a gasket 28a engages the lower surface of tank bottom 30a through which hole 31a extends and causes the flange 23a to press gasket 28a against the tank bottom 30a adjacent to the hole 31a. The gaskets 24a and 28a serve to prevent egress of water from the tank through hole 31a.

The upper end of spud 20a is inclined as at 32a to provide a lateral offset open upper end surrounded by an annular rib 33a. Such offsetting of the valve seat on the spud makes it possible to locate the hole 31a close to a wall of the tank without interference by that wall with the skirt 5a or the periphery 11a of disc 2a. A spider 35a is disposed within, and formed integrally with, the upper end of the spud and has an opening 34a in which the guide 36a may be secured.

A guide 36a is, preferably, cruciform in cross section, that is, it consists of four flat plate-like, longitudinally extending, ribs or members 37a arranged at 90° to one another as is better shown in FIG. 8. The edges of opposed plates 37a are so dimensioned as to have a small clearance with the upper end of tube 1a as indicated at 38a and with the portion of tube 1a within skirt 5a as is indicated at 38b. Between edge areas 38a and 38b the edges of the plates 37a are cut away as at 39a. By reason of this edge configuration of the plate members 37a the guide 36a serves to permit ready movement of the tube 1a up and down along the guide but insures accurate location of the tube including disc flange 13a when the tube is approaching valve-closing position. Thus, accuracy is insured with a minimum of friction.

Guide 36a is provided at its upper end with a stop 40 which limits the upward movement of tube 1a. This stop has an opening therethrough partly defined by an inwardly projecting flange 41 which is seatable in notches 42 in the upper end of guide 36a. FIG. 8 shows the configuration of the inner periphery of flange 41 and indicates how stop 40 may be assembled with, locked on, and disassembled from guide 36a. This flange 41 has four stops 45 spaced 90° apart and serving to limit the rotational movement of spider 36a in stop 40. The inner surface of flange 41 extends gradually outward and forms adjacent to the rear side of the stop 45 an enlarged space 47. The diametrical distance across the opposed surfaces 47 is greater than the overall diameter of two opposed plates 37a of guide 36a while the diametrical distance across opposed surfaces 46 adjacent to stops 45 becomes only slightly less than the diametrical distance across the two opposed plates 37a. Thus, the stop 40 may be readily assembled with guide 36a simply by positioning the plates 37a of the guide in spaces 47 and then relatively rotating the guide and stop to bring the plates 37a of the guide against stops 45.

The embodiment of the present invention shown in FIGS. 6 to 8 may be constructed entirely of molded plastic except, of course, the disc 2a, the gaskets 24a and 28a and the gasket carrying ring 27a. Thus, the metal tube 36 of the modification of FIG. 1 has been replaced by the plastic guide 36a.

It will be understood that the modification of the invention shown in FIGS. 6 to 8 possesses two distinct advantages, namely, the ability to position the spud close to a wall of the tank due to the offset spud and the substitution of the plastic guide for the metal guide 36 and projections 3 and 4 in tube 1 of the modification of FIG. 1.

The guide 36a also serves to guide the refill water, from tube 43 down into the spud. The water which is directed into the corner between members 37a will hug the corner, due to capillary action and, thus, will flow silently into the spud.

Various plastic materials such as were noted above may be used to construct the parts of the modification shown in FIGS. 6 to 8; and the dimensions, weights and the like of the parts of the first modification as described above in connection therewith may also be used with the modification of FIGS. 6 to 8.

The mode of operation and results of the modification of FIGS. 6 to 8 are substantially the same as those of the modification of FIGS. 1 to 5.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A flush valve for a water tank having side and bottom walls comprising:
   (a) a valve assembly including an elongated tube, a skirt attached to the tube near its lower end and including an outwardly extending ring-like wall and a cylindrical wall extending downwardly from the outer part of said ring-like wall and having an annular outwardly extending flange at its lower edge, said skirt being open at the lower end and defining an annular chamber around the tube, said tube and skirt being composed of material having a specific gravity of approximately 1,
   (b) a spud to extend through the bottom wall of the tank and having an annular valve seat at its upper end and disposed above the inner surface of said bottom wall, the upper surface of said seat extending outwardly and downwardly, and
   (c) a resilient disc closing the open end of the chamber, said disc having an inner cylindrical portion around and engaging the tube and an outer peripheral portion in the form of a flange providing a groove open on the side facing said tube, the outwardly extending flange on the skirt extending into said groove and serving to retain the disc in assembled position with the skirt, said disc having a downwardly and outwardly inclined annular flange positioned for engagement of its inner surface with the said annular surface of said seat and having a plurality of openings into the chamber within said flange, the area of the top surface of the skirt being greater than the area of the disc outside of said flange.

2. The combination of elements set forth in claim 1 in which the spud is provided with a spider and a guide for the tube is secured to and extends upwardly from the spider within and to above the top end of the tube.

3. The combination of elements set forth in claim 2 in which the guide consists of a plurality of flat plate-like, longitudinally extending ribs having edge surfaces opposed to the inner surfaces of the tube.

4. The combination of elements set forth in claim 3 in which the said ribs are four in number and are radially arranged in the tube.

5. The combination of elements set forth in claim 3 in which the said ribs have upper and lower longitudinal tube guiding areas and longer areas therebetween of smaller diametrical dimensions.

6. The combination of elements set forth in claim 3 in which grooves are formed in substantially the same horizontal plane in said ribs near their upper ends and in which a stop for the tube is provided with an inwardly extending flange which is rotatably seated in said grooves and the inner edge of said flange is cut away to permit axial separation of said stop and tube upon relative rotation thereof.

7. The combination of elements set forth in claim 1 in which the tube has a substantially closed loop near its upper end to receive a flush lever.

8. The combination of elements set forth in claim 1 in which the upper part of the spud, the spider, the guide and the tube are laterally displaced whereby the spud may be positioned adjacent to a tank side wall and the skirt will be out of contact with said wall.

References Cited by the Examiner

UNITED STATES PATENTS

| | | | |
|---|---|---|---|
| 2,463,458 | 3/49 | Freyn | 4—255 XR |
| 2,693,601 | 11/54 | Smith | 4—58 |
| 2,726,403 | 12/55 | De Gree | 4—57 |
| 2,945,239 | 7/60 | Fulton et al. | 4—58 |
| 3,107,747 | 10/63 | Parkison | 4—58 XR |

FOREIGN PATENTS 425,210  3/35  Great Britain.

LEWIS J. LENNY, *Primary Examiner.*

EDWARD V. BENHAM, *Examiner.*